United States Patent [19]

DeFeo et al.

[11] 4,378,744

[45] Apr. 5, 1983

[54] FLUIDIZED BED COMBUSTOR AND REMOVABLE WINDBOX AND TUBE ASSEMBLY THEREFOR

[75] Inventors: Angelo DeFeo, Totowa; William Hosek, Mt. Tabor, both of N.J.

[73] Assignee: Curtiss-Wright Corporation, N.J.

[21] Appl. No.: 257,852

[22] Filed: Apr. 27, 1981

Related U.S. Application Data

[62] Division of Ser. No. 62,746, Aug. 1, 1979, Pat. No. 4,292,023.

[51] Int. Cl.³ .............................................. F23L 5/00
[52] U.S. Cl. ................................. 110/182.5; 110/245; 122/4 D; 165/104.16; 239/600; 431/170
[58] Field of Search ................... 431/7, 170; 110/245, 110/263, 182.5; 122/4 D; 165/104.16; 34/57 A; 239/600

[56] References Cited

U.S. PATENT DOCUMENTS

| | | | |
|---|---|---|---|
| 3,633,887 | 1/1972 | Bechthold et al. | 431/170 X |
| 4,148,437 | 4/1979 | Barker et al. | 431/170 X |
| 4,165,040 | 8/1979 | Beacham et al. | 431/170 X |

*Primary Examiner*—Edward G. Favors
*Attorney, Agent, or Firm*—McGlew and Tuttle

[57] ABSTRACT

A fluidized bed combustor comprises a housing having a chamber therein with a top having a discharge for the gases which are generated in the chamber and a bottom with a discharge for heated fluid. An assembly is arranged in the lower portion of the chamber and the assembly includes a lower plate which is mounted on a support flange of the housing so that it is spaced from the bottom of the chamber and defines a fluid plenum between it and the bottom of the chamber for the discharge of heated fluid. The assembly includes a heat exchanger inlet plenum having tubes therethrough for the passage of fluidizer air and a windbox above the heat exchanger plenum which has a distributor plate top wall. A portion of the chamber above the top wall defines a fluidized bed.

10 Claims, 7 Drawing Figures

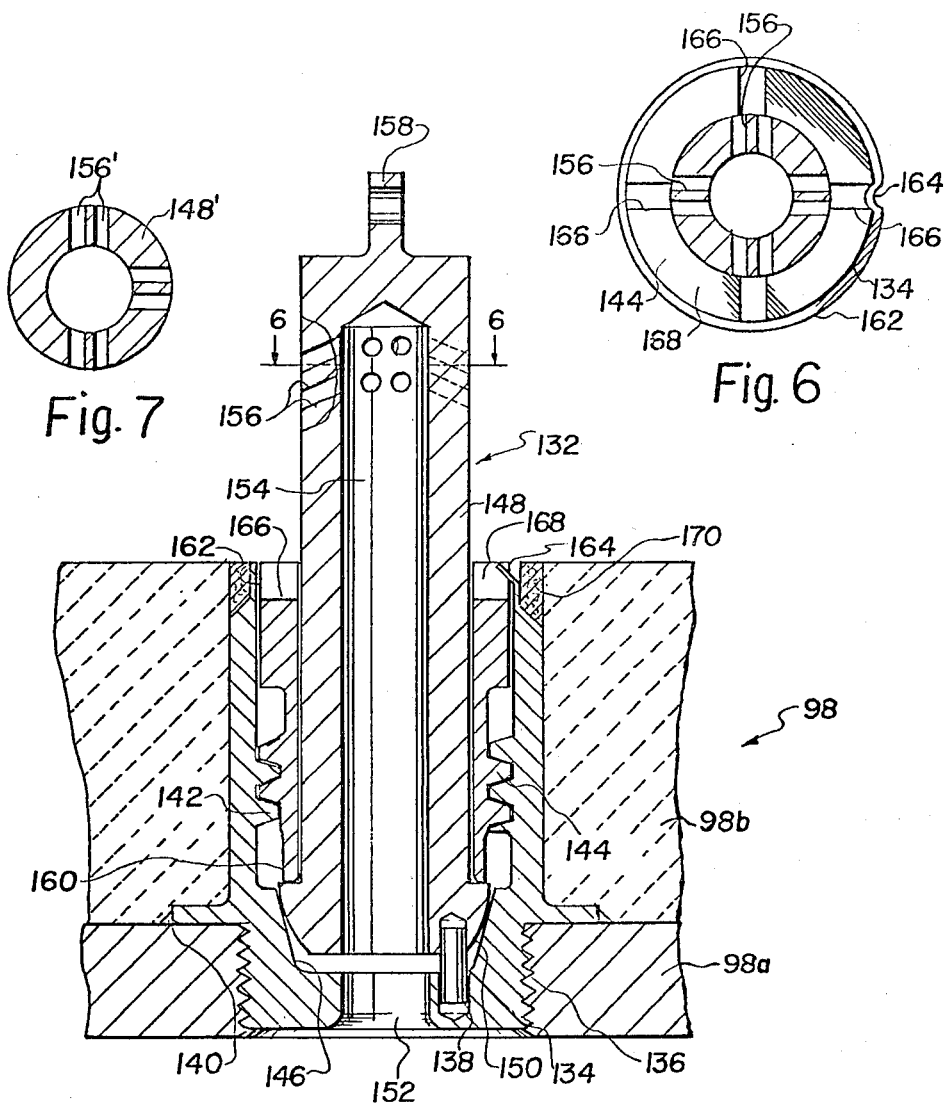

FLUIDIZED BED COMBUSTOR AND REMOVABLE WINDBOX AND TUBE ASSEMBLY THEREFOR

The Government has rights in this invention pursuant to Contract No. EX-76-C-01-1726 awarded by the U.S. Energy Research and Development Administration, now known as the Department of Energy.

This is a division of application Ser. No. 062,746 filed Aug. 1, 1979 U.S. Pat. No. 4,292,023.

BACKGROUND OF THE INVENTION

Field of the Invention

This invention relates, in general, to fluidized bed combustion and, in particular, to a new and useful fluidized bed combustor which includes a reaction chamber having a removable assembly therein which includes a heat exchanger inlet plenum, a windbox with fluidizer air tuyeres and a mounting for heat exchanger tubes and which is separately supported within the combustor housing.

In the operation of fluidized bed combustors where the fluidized bed is cooled by a cooling fluid which is circulated through tubes which extend up into the bed, it is not unusual that the various operating parts including the heat exchanger tubes must be examined and/or replaced during the operation of such devices. The difficulty with the known construction is that the heat exchanger tubes which are used for cooling the fluidized bed are not easily accessible and, in addition, even when damage or repair is evident it cannot be replaced without a major shutdown of the combustor and a disassembly of a portion of the housing to facilitate removal and replacement of the various parts.

SUMMARY OF THE INVENTION

In accordance with the present invention, there is provided a fluidized bed combustor which includes a chamber having support means adjacent the bottom thereof for supporting a whole assembly which includes a movable heat exchanger windbox and distributor plate together with a mounting for the heat exchanger tubes. With such an arrangement, the whole assembly of the tubes for supplying and removing the heat exchanger fluid to the fluidized bed as well as the need for directing the coal and fluidizer air into the bed may be easily removed through the bottom of the housing for replacement of the whole assembly or any part thereof. In addition, the assembly which is subjected to high temperatures during the operation of the device may be mounted on support elements such that this high temperature assembly is insulated from the support. In this manner, the heat which is generated in the reactor will not be dissipated to the outside through the housing parts.

Accordingly, it is an object of the invention to provide a fluidized bed combustor and removable windbox and tube assembly therefor which comprises a housing having a chamber therein with a top being provided with a discharge for the gases generated in a combustor and a bottom having a discharge for heated fluid and which further includes an assembly supported in the lower portion of the housing chamber which includes a heat exchange plenum and a windbox above the heat exchange plenum having a distributor plate top wall above which a fluidized bed is defined in the chamber and which is supported on support means extending outwardly from the interior of the housing into the chamber above the bottom so that the space between the assembly and the bottom defines a discharge plenum which opens into a discharge for heated fluid and which further includes means for directing fluidized air into the assembly through the heat exchanger inlet plenum and into the windbox for discharge through tuyere means which are mounted in the distributor plate into the fluidized bed and which further includes means for directing coal into the fluidized bed for ignition with the fluidized air for the heating of heat exchanger tubes which extend into the fluidized bed and which are mounted in the assembly and which advantageously have a cooling fluid inlet for the inflow of the bed cooling air and a discharge which discharges into the plenum for discharge out of the chamber. A further object of the invention is to provide a removable assembly of windbox, heat exchanger inlet plenum and heat exchanger tube mounting means for use in a fluidized bed combustor arranged to provide an easy mounting within the combustor for connection to an inlet to fluidizing air and another inlet for cooling fluid and which contain the heat exchanger inlet plenum having tubes therethrough for flow of the fluidizing air into a windbox in a distributor plate having tuyeres for the discharge of the fluidizing air into the fluidized bed. The assembly also includes means for mounting a tube assembly for the inflow of cooling fluid from the heat exchanger inlet plenum upwardly into the tube extending into the bed and then for downward flow through the tubes and to a discharge plenum which would be defined below the assembly when it is mounted in the chamber.

A further object of the invention is to provide a method of erecting and disassembling a fluidized bed reactor which comprises a housing which has separable upper and lower shell portions and wherein an assembly comprising heat exchanger tubes, a distributor plate for directing fluidizing air and providing a support for a fluidized bed as well as a windbox, heat exchanger inlet plenum and a bottom section defining a support flange are supported on a ring of the lower shell portion and wherein the assembly is first connected to the lower shell portion after it has been separated from the upper shell portion, and the lower shell portion with the assembly are connected to the upper shell portion advantageously with the interposition of the insulation means therebetween to prevent the transfer of the high temperature heat of the assembly through the housing of the reactor.

A further object of the invention is to provide an improved tuyere construction and a method of aligning and mounting a tuyere on a distributor plate so that the discharge passages thereof may be aligned in respect to heat exchanger tubes which are maintained in a fluidized bed. A still further object of the invention is to provide an improved tuyere construction for directing fluidizing air into a fluidized bed which is capable of operating at high temperatures and may be accurately aligned and positioned in respect to the fluidized bed.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the Drawings:

FIG. 5 is an enlarged partial sectional view of an improved tuyere constructed in accordance with the invention;

FIG. 6 is section taken along the line 6—6 of FIG. 5; and

FIG. 7 is a view, similar to FIG. 6, of a portion of the tuyere of another embodiment of the invention.

DESCRIPTION OF THE PREFERRED EMBODIMENTS

Figure 1:
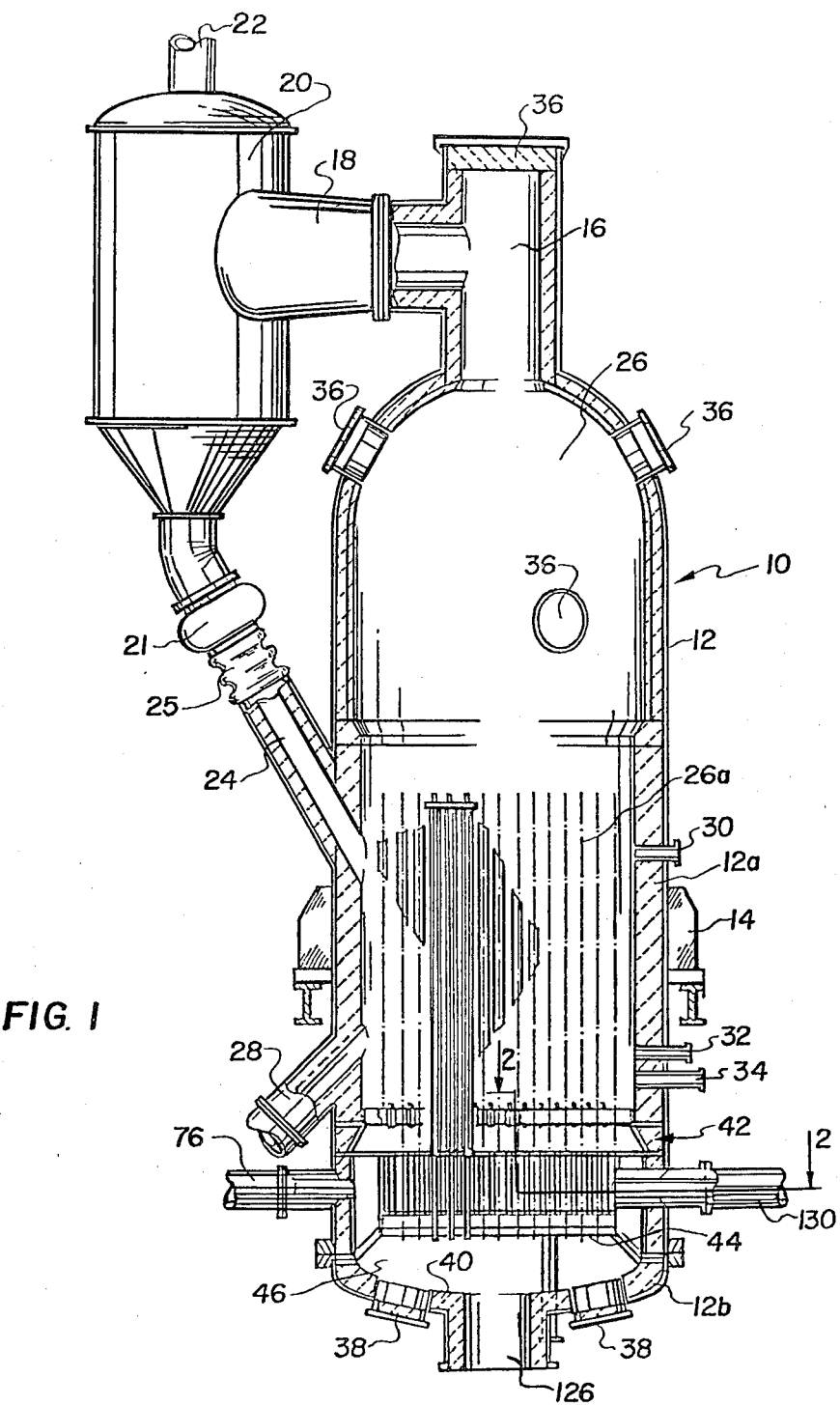
FIG. 1 is a vertical sectional view partly in elevation of a fluidized bed combustor constructed in accordance with the invention.

Referring to the drawings in particular, the invention embodied therein comprises a fluidized bed combustor which is advantageously of a type wherein a fluid such as air is circulated to the combustor for cooling a fluidized bed and for absorbing the heat therefrom and for using the air for operating a machine such as a gas turbine. The combustor 10 includes a housing generally designated 12 having an upper shell portion 12a and a lower shell portion 12b which is separable therefrom and which may be clamped back thereto. The whole housing 12 is supported on a support 14 which makes it possible to disconnect the lower portion 12b from the upper portion 12a and withdraw it downwardly while the upper portion 12a remains attached to the support 14. The housing 12 includes a top having a flue offtake 16 for combustion gases entrained of matter which is delivered through a conduit 18 into a dust separator 20. Clean gases are withdrawn through a stack or flue 22 and separated dust is delivered downwardly through a trickle valve 21 into a return conduit 24 into the interior of the housing into a reaction chamber 26 therein which is maintained under pressure and which has a fluid bed portion 26a at the lower end thereof. The conduit 24 has a bellows portion 25 to permit thermal expansion and retraction. Spent ashes from the fluidized bed 26a are removed through an ash discharge 28 which connects into the lower end of fluidized bed portion 26a. A side wall of the reactor also provides a mounting for an absorbant gun 30 directing an absorbant material into the fluidized bed 26a. In addition, an oil gun 32 and a plurality of coal feed guns 34 are provided in the side wall to direct oil and/or fuel into the reaction chamber to provide a support for combustion during the operation of the device.

The housing 12 is also provided with many manholes 36 for the top part 12a as well as two additional manholes 38 in a bottom wall 40 of the housing. These manholes are large enough to provide access into the interior of the housing 12.

Figure 4:
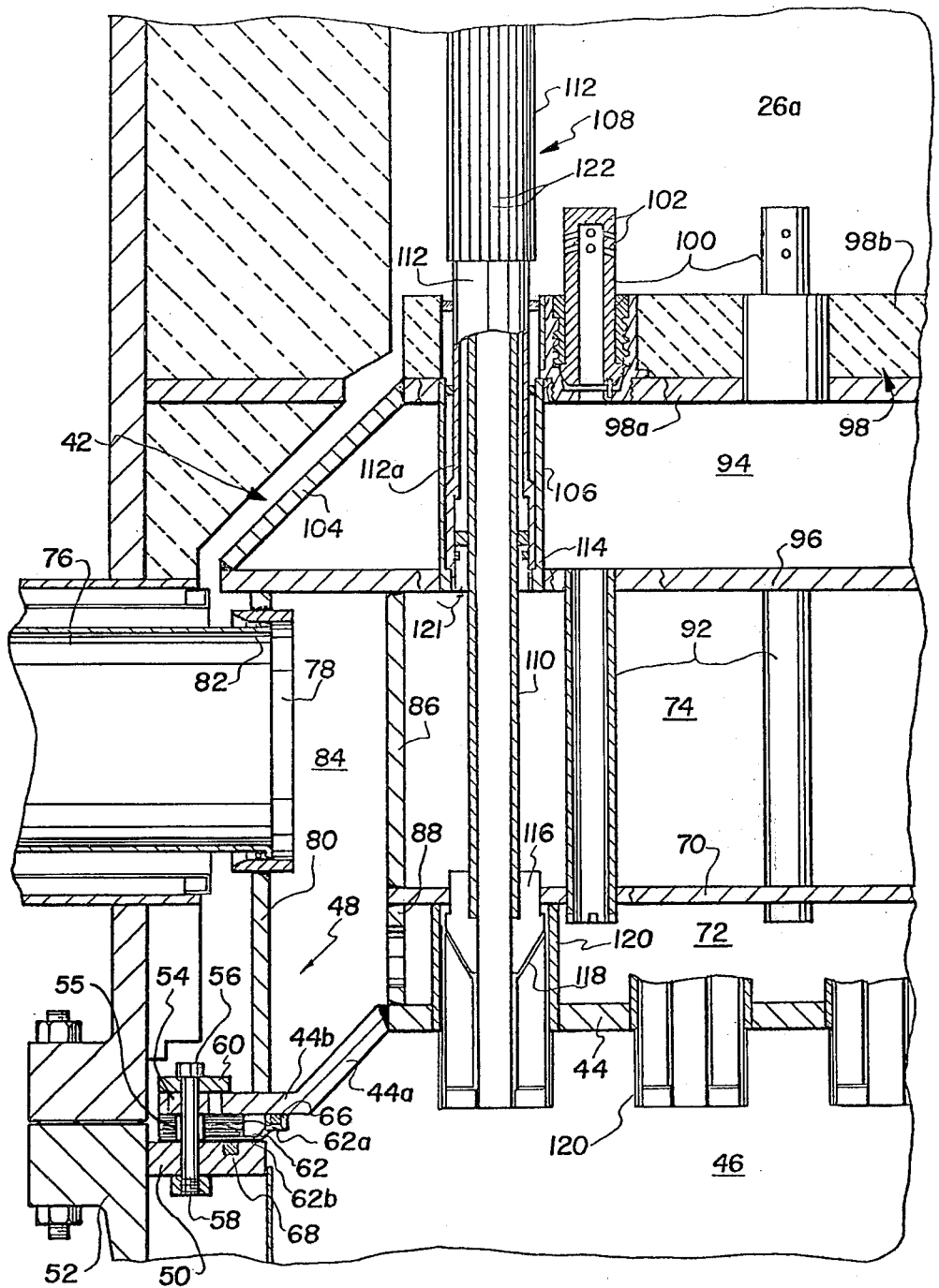
FIG. 4 is a view similar to FIG. 1 showing a further detail of the removable windbox and tube assembly with the combustor shown in FIG. 1.

In accordance with the invention, a removable windbox, heat exchanger inlet plenum and heat exchanger tube support assembly generally designated 42 is removably positioned within the housing below chamber 26 so that a bottom mounting wall 44 thereof is spaced upwardly from the bottom wall 40 of the housing 12 so as to define a plenum chamber 46 therebetween. The assembly 42 is mounted on support means 48 which comprises a circular annular flange 50 positioned around the interior of the lower end of the housing 12 and carried by a clamping joint 52 as best seen in FIG. 4. For this purpose, the bottom plate 44 includes an offset portion 44a having a flange 44b which is interrupted circumferentially. In the preferred construction, flange portion 44b has twenty-four equally spaced, rectangular slots machined into the outer perimeter. Position lugs 54 fit into the slots of the flange 44b and they are attached to the supporting flange 50 by fit screws or bolts 56 for positioning the lugs 54, the flange 50 and a nut plate 58 are reamed and tapped as applicable to accurately locate the assembly relative to the housing 12 and chamber 26. Twenty-four retaining plates 60 overlie respective areas of the plate 44b and are clamped to the positioning lugs 54 and through the flange 50. Clearance is provided between the positioning lugs 54 and the bottom of the flange slots of the flange 44b to allow for the thermal growth of the heat exchanger and distributor assembly. The positioning lugs and slot arrangement maintains the position of the assembly during thermal growth or temperature changes.

In order to minimize the thermal stresses in the lower flange, a thermal barrier is required to isolate the hot support plate 44 from the relatively cool vessel flange 50. This thermal barrier designated 62 comprises twelve layers of $\frac{1}{8}$ in. thick ceramic fiber insulation with each four layers separated by a wire screen. The assembly is sewed together with glass thread for handling purposes. A segmentated plate 62a covers the top of the thermal barrier 62 and a seal plate assembly 62b covers the bottom. Spacers 55 limit the amount of compression of the insulation and transmits the heat exchanger distributor loads to the vessel flange 50. The construction includes a seal packing 66 located in the seal plate assembly 62b and a packing 68 is located in flange 50 so as to seal the bottom of the joint, the support means and the assembly.

The assembly 42 includes a wall 70 which forms a top wall of a lower fluidizing air inlet section 72 and it comprises the bottom wall of a heat exchange inlet plenum 74. The fluidizing air inlet section 72 is supplied with fluidizing air from a fluidizing air supply tube 76 which is fitted into sealing engagement with a tubular fitting 78 at an inwardly spaced location from its sealed entrance into the housing 12. The tubular fitting 78 is supported on a outer side wall 80 of the assembly 42 and is provided with sealing means which permit interengagement of the supply tube with the assembly in a sealed manner. Fluidized air is admitted through one or more of the supply tubes 76 to an annular space 84 defined by the outer side wall 80 of the assembly and an inner side wall 86 of the heat exchange plenum 74 and a continuation 88 thereof which forms a side wall of the fluidizing air inlet lower section 72. Advantageously four ait supply tubes 76 are provided for the fluidizing air which flows into one of many inlet openings or ports of the fluidizing air inlet section 72. The number of such ports may, for example, comprise some sixty in number. The air flows throughout the section 72 and then flows upwardly through vertical pipes or tubes 92 which extend through the heat exchange inlet plenum 74 and discharge into a windbox 94 defined between a top wall 96 of the heat exchange plenum 74 and a distributor plate assembly 98 which is spaced vertically upwardly therefrom and defines a top wall of the windbox for the fluidizing air. Air from the windbox 94 is then circulated upwardly through tuyeres or nozzles 100 which extend through the distributor plate assembly 98 directed outwardly through downwardly sloping ports or passages 102 to the chamber portion 26a at the lower end of the fluidized bed. During the startup cycle, 1000° F. air circulates in this manner and uniformly heats the windbox 94 and the fluidizing air inlet section 72 to minimize thermal stresses. The structure also provides adequate heat paths between the sections so that thermal stresses are minimized during bed soak-back after shutdown. Windbox 94 has side walls 104 and the distributor plate 98 includes a bottom metallic plate portion 98a with an overlying cast insulation portion 98b.

The distributor wall 98 and the wall 96 are interconnected by tubes 106 which, in the preferred arrangement, number in excess of one-hundred and seventy-five tubes that provide mounts or sockets for heat exchanger tube assemblies generally designated 108. The heat tube assemblies include an inner tube portion 110 arranged within its space radially inwardly of an outer tube portion 112. The lower end of the outer tube portion 112 is provided with an adapter 112a which is engaged on a shoulder 114 formed in each of the tubes 106. The inner tube portion 110 is much longer than the outer tube portion 12 and is connected, through a conical adapter 116, to a conical adapter 118 which in turn is connected to tubular element 120 which is connected to plate 44. The inner tube portion 110 is spaced radially inwardly from the outer tube portion 112 so as to define an air cooling fluid inlet 121 at the location of the heat exchange inlet plenum top wall 96. The flow of the cooling air is upwardly through the outer tube portion and into the fluidized bed area 26a and heat is transferred in the cooling fluid by the fluidized bed which is enhanced by the provision of fins 122 which are formed on both the outside and inside surface of the outer tube portion 112. Air which is heated when it flows upwardly in the space between the outer and inner tubes portions 112 and 110 is then directed downwardly through the top of the inner tube portion 110 and flows downwardly through the inner tube portion 110 and is discharged into the plenum 46 and exits through a discharge opening 126 through the bottom wall 40 of the housing 12.

Figure 3:
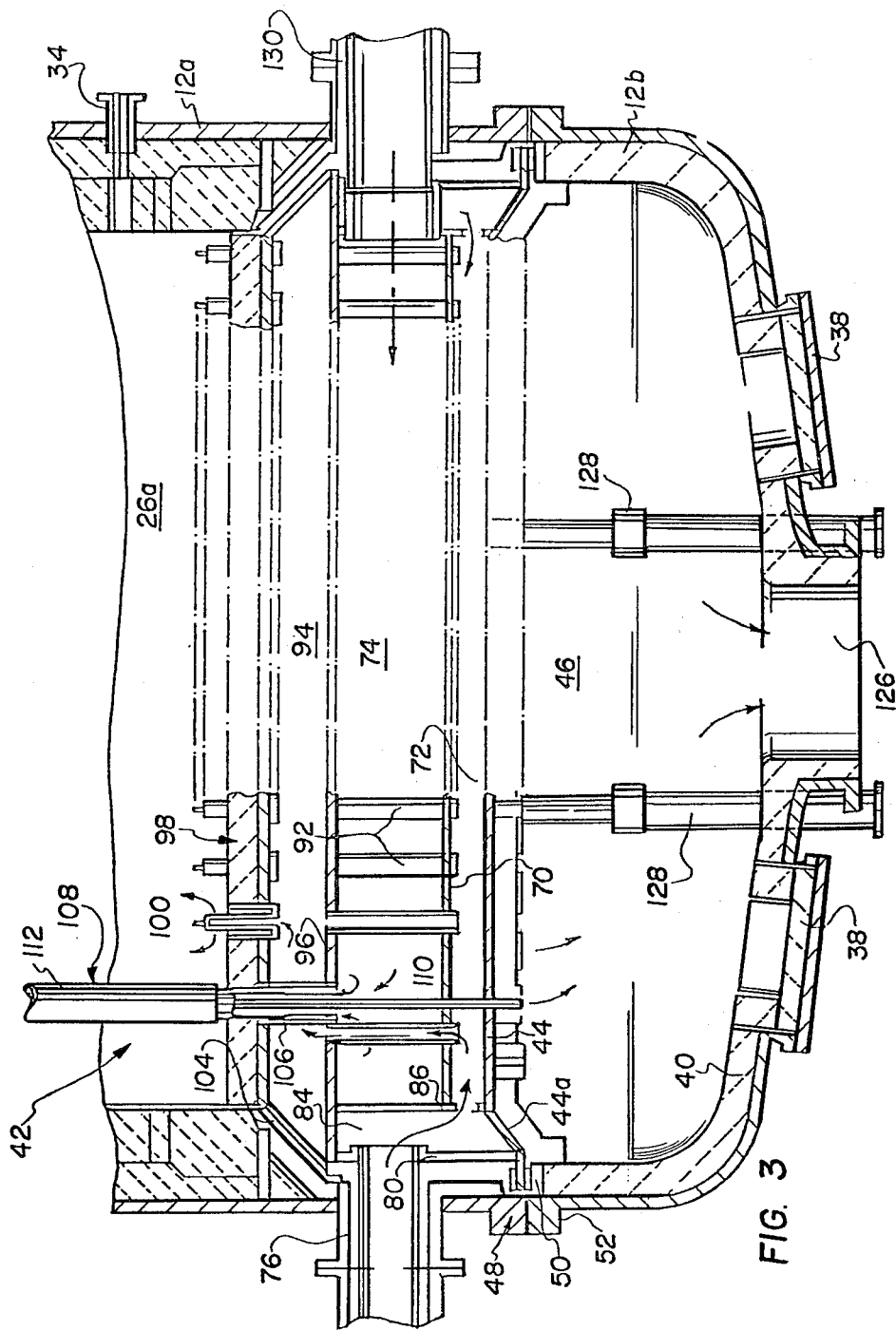
FIG. 3 is a view similar to FIG. 1 showing an enlarged detail of a portion of the combustor shown therein.

The tubes 106 are spaced approximately 10 inches apart and in a square pattern. This produces a corridor of about 4 inches wide between the two rows. The tuyeres or nozzles 100 are located in the centers of these squares and over one-hundred-eighty are advantageously employed, distributed over the area except in those locations where four vertically extending coal guns 128 are provided which are shown best in FIG. 3 and extend inwardly from the exterior of the vessel through the plenum 46, wall 44, the heat exchange inlet plenum 74, windbox 94 and the distributor plate assembly 98 and discharge into the fluidized bed area 26a. The top wall portion 98b of the distributor plate 98 is provided with thermal insulation of about five inches of castables. The wall 96 contains openings for receiving the individual tubes 92 and for the passage of the coal gun tubes.

A cooling fluid or a heat exchange fluid, such as air, is directed into a plurality of conduits 130 which communicate with the interior of the heat exchanger inlet plenum 74. The fluid, such as air, is circulated around the tubes 92 and then through the inlet 121 defined between the outer and inner tube portions 112 and 110 of the heat exchanger tube assemblies 108. The fluid serves to cool the fluidized bed and/or to heat the cooling fluid so that it may be used for purposes of driving machinery such as a gas turbine.

When the assembly 42 is to be removed, it is advantageous to separate the lower shell portion 12b from the upper shell portion 12a. Thereafter, the bolted connections 56 may easily be loosened and the whole windbox and heat exchanger assembly 42 removed from the lower shell portion 12b. Before this time, the fluidizing air inlet pipe 76 is detached from the fittings 78. For these purposes, these fitting 78 are bored to accept a piston ring of the fluidizing air tube 76 which forms part of the sealing means 82. The piston ring may permit an easy sliding disengagement of the two parts. In addition to the fact that the whole assembly 42 may be removed together with the heat exchanger tube assemblies 108, these tube assemblies 108 may be easily separated from the remaining portion of the assembly 42 and for this purpose they are advantageously arranged in groups which may be easily lifted outwardly from their connecting elements after they are detached. Reinsertion of the tube assemblies or groups thereof may be carried out in a similar manner and just as easily. Either the tube assemblies are first attached into groups and inserted or they are separately installed after the remaining portion of the group is inserted in the reactor and this can be done for example by access through one of the manholes 36 in the top section 12a or by supporting the upper section and lowering the lower section 12b from the upper section 12a.

Referring to FIGS. 5, 6 and 7, in accordance with the invention, there is provided an improved tuyere, generally designated 132, which includes an outer socket portion or sleeve 134 having a threaded part 136 which is threadably engaged with the plate 98a. When the socket portion 134 is threaded into the plate 98a, it is turned until it is oriented to align a dowel indicating pin 138 in a selected angular position chosen to provide direction to air and discharge from the tuyere when it is completely assembled. When this position is obtained, the socket portion 134 is anchored in position, for example, by welding at 140 to the plate 98a.

Figure 2:
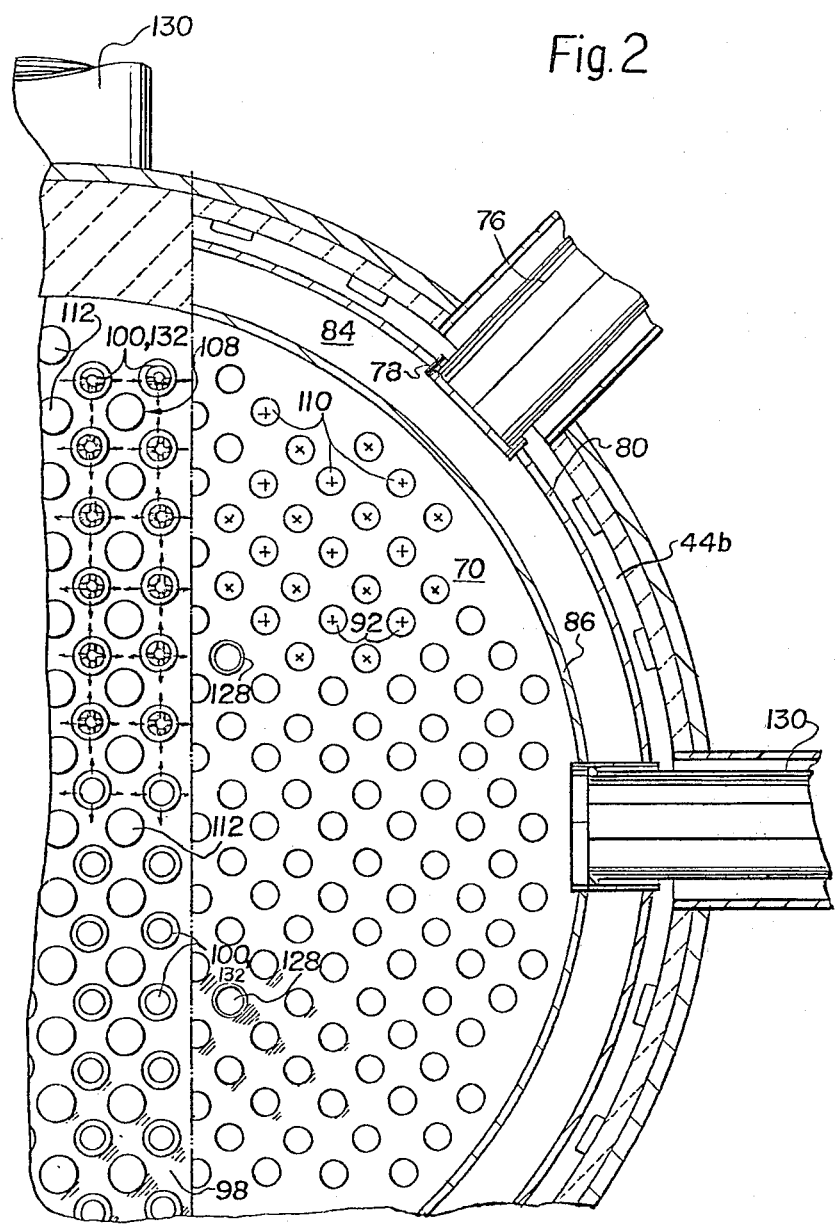
FIG. 2 is an enlarged partial sectional view taken along the lines 2—2 of FIG. 1.

The socket portion 134 is internally threaded and is advantageously provided with a coarse thread 142 such as an Acme thread, on its interior which is loosely engaged with a similar coarse thread of a retaining sleeve or nut 144 so as to prevent possible seizure. The socket body 134 also includes an inner part having a conically-formed bearing surface 146. A sleeve body 148 of the tuyere has a lower end with a spherically-formed surface which bears against the conically-formed surface 146 providing a tight seal. In addition, it has an opening which is aligned over the dowel indicating or centering pin 138. The socket 134 defines an inlet opening 152 which communicates with a central passage 154 of the sleeve body 148. The central passage 154 communicates, in turn, with one of a plurality of downwardly extending discharge passages 156 which, in the embodiment of FIGS. 5 and 6, are arranged in pairs disposed at right angles to each so that fluidizing air is discharged into a fluidizing bed at four equally, angularly spaced locations. As shown in FIG. 2, tuyeres are advantageously arranged between the heat exchanger tube assemblies 108 and the discharge air streams are directed between the tube rows. In the embodiment of FIG. 7, only three angular positions of discharge for discharge passages 156' are shown for the alternate embodiment of sleeve body 148'. These are located on the perimeter of the bed so that air is not directed towards the shell walls. It is the positioning dowel 138 that determines the orientation of the discharge passages, and with this inventive arrangement, the position may be easily determined when the socket portion 134 is secured to the plate 98a.

The sleeve body 148 advantageously includes a lug portion 158 defining a lifting eyelet which may be engaged by a crane to lift the device upwardly. To facilitate the installation of the sleeve body 148 to the socket body 134 and to permit a mounting of the sleeve body 148 so that they will remain tight and provide a seal so that all the fluidizing air will discharge through the tuyere discharge passages 156, the retaining sleeve 144 is threaded by the Acme thread 142 into a position at which it presses the surface 150 into engagement with the surface 146 by engagement of the lower end of the retaining sleeve 144 on a shoulder 160 of the sleeve body 148. In this manner, a secure hold is effected without changing the alignment of the sleeve body 148 after it has been inserted over the positioning dowel 138. In order to insure that the threaded portions are locked in place, the socket portion 134 is provided with an upper end with rim 162 of slight width which is crimped at 164 into a wrench engagement slot 166 defined at the upper edge 168 of the retaining sleeve 144. The retaining sleeve may be threaded into position by a wrench engageable in the slots 166. An insulating material 170 is disposed in the space between the upper top portion of the socket portion 134 and the refractory material 98b.

While specific embodiments of the invention have been shown and described in detail to illustrate the application of the principles of the invention, it will be understood that the invention may be embodied otherwise without departing from such principles.

What is claimed is:

1. A tuyere for directing air into a fluidized bed of a fluidized bed reactor comprising a hollow socket member having an exterior threaded portion for threading it to a support by an amount to position it at a predetermined angular position and having an air inlet passage therethrough and an interior with a curved receiving surface, an indicating member connected to said hollow socket member and projecting outwardly from said curved receiving surface, a tubular sleeve body engaged in said hollow socket member and having a side wall with a ledge portion and a sleeve body curved surface below said ledge portion engaged on said curved receiving surface and having a recess into which said indicating member extends to fix said tubular sleeve body angularly in respect to said hollow socket member, the interior of said hollow socket member being spaced outwardly of said tubular sleeve body and having a coarse threaded portion, said tubular sleeve body having an interior passage therethrough aligned with said air inlet passage and having a plurality of radially extending discharge passages adjacent the upper end thereof extending radially outwardly therefrom at a plurality of angularly spaced locations, the angle of disposition of each of said passages being determined by the position of said tubular sleeve body relative to said hollow socket member as determined by said indicating member, and a retaining sleeve disposed in said hollow socket member between said hollow socket member and said tubular sleeve body and being threaded to said hollow socket member and engaged on said ledge to urge said curved surface of said tubular sleeve body into engagement with the curved surface of said hollow socket member.

2. A tuyere according to claim 1, wherein said radially extending discharge passages extend obliquely downwardly from said interior passage to the exterior of said tubular sleeve body.

3. A tuyere according to claim 2, wherein said radial passages comprise a passage extending outwardly from said interior passage at four right-angular locations.

4. A tuyere according to claim 2, wherein said radial passages extend outwardly at three separate right-angular locations from said interior passage.

5. A tuyere according to claim 1, wherein there are a pair of passages located at each right-angular position extending outwardly from said interior passage.

6. A tuyere according to claim 1, wherein said indicating member comprises a dowel fitting into said hollow socket member adjacent the curved surface thereof and extending upwardly into engagement with said tubular sleeve body.

7. A tuyere according to claim 1, wherein said retaining sleeve includes a top edge having a slot, said socket member having an upper rim of slight thickness which is crimped into said slot to lock said retaining sleeve relative to said socket member.

8. A method of positioning a tuyere having a tubular sleeve body containing a passage for fluidizing air, one or more radially extending discharge passages oriented at selected angles which is mounted in a hollow receiving socket member which is adapted to be attached to a distributor plate of a combustor having a fluidized bed which comprises threading the hollow socket member to the distributor plate so that it is positioned at a desired position, connecting a dowel to the socket member so that it projects outwardly from the interior of the socket member at this adjusted position, securing the socket member to the distributor plate at the adjusted position, inserting the sleeve body into the socket member so that a recess of the sleeve body engages with the dowel to lock it in the adjusted position and applying a threaded retaining sleeve in a space between the socket member and the tubular sleeve body by threading the retaining sleeve into the socket member causing it to bear against the tubular sleeve body to press the sleeve body into a desired position in engagement with the dowel.

9. A method according to claim 8, wherein the socket member and the retaining sleeve are provided with a coarse interengaged thread to permit adjustment thereof and wherein the sleeve body and receiving socket member have engageable surfaces and including threading the retaining sleeve so as to bear against the tubular sleeve body and urge the engagement surface thereof into engagement with the receiving socket member surface.

10. A method according to claim 9, including crimping an upper edge of the receiving socket member into engagement with the retaining sleeve after the retaining sleeve has been threaded into an adjusted position so as to prevent the rotation thereof.

* * * * *